Sept. 5, 1944. G. W. PENNEY 2,357,354
ELECTRIFIED LIQUID SPRAY DUST-PRECIPITATORS
Filed May 13, 1941 2 Sheets-Sheet 2

WITNESSES:
E. F. Oberheim
B. L. Zangwill

INVENTOR
Gaylord W. Penney
BY O. D. Buchanan
ATTORNEY

Patented Sept. 5, 1944

2,357,354

UNITED STATES PATENT OFFICE 2,357,354

ELECTRIFIED LIQUID SPRAY DUST PRECIPITATOR

Gaylord W. Penney, Wilkinsburg, Pa., assignor to Westinghouse Electric & Manufacturing Company, East Pittsburgh, Pa., a corporation of Pennsylvania Application May 13, 1941, Serial No. 393,189

12 Claims. (Cl. 183—7)

My invention relates to electrical gas-cleaning precipitators or similar apparatus for removing dust or dust-particles from gaseous streams, by dust or dust-particles meaning any foreign particulate matter capable of being removed from a gas by electrical means and methods. My invention is useful for the removal of atmospheric-dust from flowing air, but also has an especial usefulness for cleaning process-dust from industrial or other dust-laden gases including gases having high dust-concentrations.

Heretofore electrical precipitators of practical application have operated generally on the principle of electrically charging the dust-particles and then causing the charged dust-particles to migrate to, or deposit on, or be collected by, a plurality of finite oppositely charged precipitating-electrodes of some extent in the direction of gas-flow. The ordinary Cottrell precipitator, used primarily for the removal of fly-ash from flue gases and also for the removal of process-dust, is one form of such prior devices in which the dust-particles are charged and collected in a single zone; and the precipitator described in my Patent No. 2,129,783, issued September 13, 1938, illustrates a more recent form of such a prior device particularly useful for cleaning air to be breathed, although it is not limited thereto, in which the dust-particles are first charged by an ionizing means in one zone and then precipitated or collected by a precipitating means in a subsequent separate zone.

Precipitators utilizing precipitating means comprising extended finite precipitating-electrodes generally permit the precipitating dust to collect or accumulate on the precipitating-electrodes, and as the layer of accumulated dust or dirt on the precipitating-electrodes becomes heavier, the operating efficiency of the precipitating means decreases so that the precipitating-electrodes must be cleaned in some manner if satisfactory gas-cleaning is to be continuously obtained. Many expedients have been devised for removing the accumulated dirt from precipitating-electrodes, which depend upon the particular type and construction of the precipitator, and may include rapping of the precipitating-electrodes to jar accumulated dirt therefrom, usually into a receptacle therebelow; or an occasional washing of the precipitating-electrodes; or arranging the precipitating-electrodes in the form of a vertically disposed movable endless chain or curtain which has a lower portion dipping into a body of oil for soaking the accumulated dirt from the particular portion of the precipitating-electrodes which happens to be immersed in the oil, small portions of the precipitating-electrodes being successively immersed. Other expedients are also known, but, in general, they all permit a layer of dirt to accumulate to some extent on the precipitating-electrodes before they are cleaned.

In accordance with certain forms of my present invention, I altogether eliminate, or at least limit the number or extent of the precipitating-electrodes of relatively fixed finite dimensions, to which the charged dust-particles migrate and collect.

It is an object of my invention to provide an electrical precipitator for removing dust-particles from a gas, which electrical precipitator has a precipitating means which does not require a plurality of parallel, oppositely-charged dust-collecting precipitating-electrodes disposed in the gas-flow path.

It is an object of my invention to provide an electrical dust-precipitator which has dust-collecting or precipitating means which permits the collected dust to be automatically taken out of the path of the gases substantially as soon as it is collected or precipitated, so that no accumulated dust deposits form in the dust-precipitator.

It is a general object of my invention to provide an electrical gas-cleaning apparatus of the type described, which has a low initial cost, which is economical to operate, which has fewer parts than prior similar devices, and which can be continuously operated without significant variations in its operating efficiency.

In the operation of the preferred embodiments of my invention, to which, however, I am not limited, the dust-particles in the dust-laden gas are separated from the gas by charging or ionizing the dust-particles therein, and subjecting the charged dust-particles to the action of a curtain or spray of a liquid, which curtain or spray (hereinafter called spray) has been electrically charged or ionized in such a manner as to cause the charged dust-particles to be attracted to the charged spray-drops. The spray is established in the path of the gas-flow, so that the gas containing the charged dust-particles must pass through the oppositely charged droplets of the spray, and this results in a thorough mixing and intermingling of the charged dust-particles and the oppositely charged liquid-drops of the spray. By subsequently separating the gas and the spray-liquid, I am able, as proved by cleaning-efficiency tests, to remove a large portion of the dust-particles from the gas-stream.

said dust-particles having been transferred to the spray-liquid, the proportion of dust-removal being an indication of the gas-cleaning efficiency.

Although other theories or explanations may be possible, it is an object of my invention to effect dust-removal, by which I mean foreign-particle-removal, from air or other gas, in accordance with the following principles and processes: Charged dust-particles and oppositely charged spray-drops have a tendency to attract each other, although there may also be actual contact due to their movements in the spray-region. When a charged dust-particle contacts an oppositely charged spray-drop, the two thereafter apparently move together, the dust-particle apparently flowing with the spray-drop, so that the gas is cleaned, and the dust-particle can, therefore, be considered as being attached or adhering to a spray-drop, so that it can be separated with the spray-liquid from the gas stream.

I preferably utilize, for the spray-producing means, a liquid or solution which is easily obtainable and which will not readily catch fire. A number of liquids are suitable, but for the embodiments of my invention shown herein, it is believed that the spraying liquid should preferably be conductive, at least to some slight extent, so that the stream of liquid, as it leaves the spraying-nozzle, will conduct the charging-current up to the point, a short distance from the nozzle, where the liquid-stream breaks up into discrete spray-particles or spray drops. Ordinary tap-water, and even ordinary distilled water, has a sufficient amount of conductivity. Tap-water is very satisfactory, and since it is readily available, it is preferred in the application of my invention. Tap-water has the additional advantage that it need not be collected after it has cleaned the gas unless it is desired to use the water for some other purpose, or to recover the collected dirt which might, in some instances, especially in the removal of process-dust, be valuable.

The use of water as the spray-material has the added advantage that the gas-cleaning equipment herein described may be combined with air-conditioning equipment if the gas to be cleaned is air, since the water-spray is also useful for washing the gas, and for controlling its humidity or conditioning it.

I have found that, in general, the smaller the charged liquid-drops, the better the dust-collection, provided that a sufficient quantity of liquid is sprayed across the gas-stream, and provided that the sprayed liquid is subsequently completely removed from the gas-stream. However, while small drops are preferable from the standpoint of ease of attachment to dust-particles, the water-droplets must not be so small that they cannot be acted upon by forces, such as, for example, electrical forces or gravitational forces, which can be utilized to separate the dust-laden liquid from the cleaned gas-stream, so that the quantity of cleaning liquid carried along with the cleaned gas-stream can be kept to as low an amount as possible or desired. In general, the liquid-spray is continuously supplied, so that the dust-precipitation is continuous, and the dust-laden liquid is continuously removed from the gas-stream, so that the removal of the precipitated dust is also continuous.

In the preferred embodiments of my invention, I utilize a two-stage or two-zone gas-cleaner, that is, the dust-particles in the gas-stream are first charged by passing the dust-laden gas through an ionizing electrostatic field which contains only the flowing gas and the ionizing means, and then passing the gas, now laden with charged dust-particles, through an electrified or charged liquid-spray which follows the ionizing field in the direction of gas-flow, the electrified liquid-spray constituting a part, or all, of the means for precipitating the dust.

The ionizing electrostatic field may be obtained by an ionizing means constructed and operated in any convenient way, and may take the form of an ionizing electrode substantially axially located in, and insulated from, a cooperating non-discharging tubular electrode through which the gas to be cleaned passes. Or the ionizing means may comprise one or more spaced ionizing electrodes spaced between, and insulated from, larger non-discharging electrodes substantially transverse to the gas-stream. An ionizing means of the latter type may be constructed in accordance with the teachings in my aforesaid patent, and is especially desirable where the gas to be cleaned is atmospheric air to be breathed. Both of the aforesaid modifications of an ionizing means are illustrated in the instant application, but it is to be understood that any suitable structural arrangement can be utilized with my present invention so long as it will provide an adequate electrostatic field for charging the dust-particles in the dust-laden gas.

The region in which the charged dust-particles are removed from the gas-stream includes the precipitating means which, in the preferred modifications of my invention, includes one or more spray-means, such as, for example, spray-nozzles or spray-pipes, located near oppositely charged field-establishing electrode-means for causing the liquid drops coming from the spray-means to be ionized or charged with a charge of a polarity which is opposite to that imparted to the dust-particles in the dust-charging ionizing electrostatic field. The spray-nozzles may each have a small tubular liquid-discharge tip so that a highly concentrated electrostatic field can be produced at the liquid-discharge tip by the field-establishing electrode-means associated therewith, which is preferably in the form of a loop or loops located at a suitable distance from the discharge-tip of the nozzle.

I have found that a charged liquid-spray for the precipitating-means of my novel gas-cleaning precipitator may establish a space-charge in the spray-region in the gas-conduit. Such a space-charge may be sufficiently intense to cause numerous flashovers and breakdowns which have the disadvantage of slightly increasing the power-consumption of the device, and of tending to produce undesirable ozone or nitrous oxide, where the gas being cleaned is air, and of temporarily adversely affecting the electrostatic fields of the gas-cleaning precipitator and thereby lowering the cleaning-efficiency. Additionally, the space-charge may limit the amount of spray-liquid which can be utilized in its spray-region, and in such cases it is desirable to use two or more sprays in series, each spray being preferably, but not necessarily, preceded by a dust-charging zone.

By incorporating suitable field-affecting means in the spray, I can limit or neutralize the space-charge, and by utilizing extended suitably charged or grounded electrodes, such as flat, curved or bent plates, for such neutralizing means, the charged liquid-drops can be caused to collect partially, or totally, on the plates which, therefore, also serve as a separator or separating-means for separating spray-liquid from the cleaned gas-stream.

Other methods, objects, features, and innovations of my invention, in addition to the foregoing, will be apparent from the following more specific description thereof which is intended to describe embodiments and modifications including at least one specific modification in sufficient detail to permit one skilled in the art to readily construct an operable embodiment of my invention. This description is taken in connection with the accompanying drawings which show, more or less diagrammatically, the essential novel elements of different embodiments of my invention.

In the drawings, which are on various scales.

In general, the structural features of my invention shown herein comprise a gas-conduit means for guiding the flow of the gas to be cleaned, and disposed in this gas-conduit means, successively in the direction of the gas-flow, are: a dust-charging means comprising an ionizing zone having an ionizing means for establishing an ionizing electrostatic field through which the gas flows and in which the dust-particles in the gas are charged; a dust-precipitating means comprising an electrified spray-means for establishing a charged liquid-spray spreading across the conduit in such manner that gas flows through the spray; and other means or expedients for separating the liquid-spray drops from the cleaned gas. Means for decreasing the space-charge which the charged spray tends to establish in the spray-region may also be included.

Figure 1:
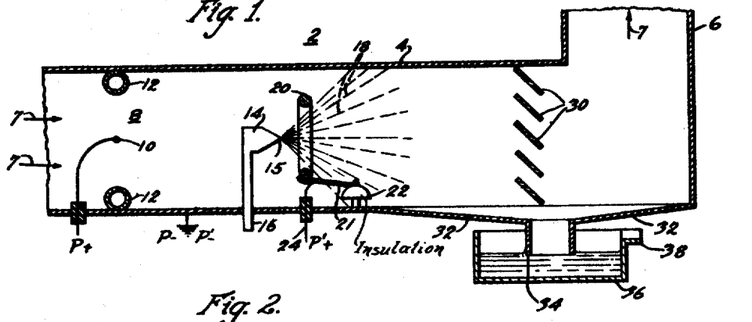
Figure 1 is a vertical sectional view of an embodiment of my invention disposed in a horizontal gas-conduit.

Referring more particularly to Fig. 1, the gas-cleaning precipitator or apparatus is indicated in its entirety by the reference numeral 2 and comprises a metallic gas-conduit means having a horizontal conduit-section 4 and a vertical duct 6. The gas-flow is indicated by the arrows 7, and a portion of the upstream side of the conduit-section 4 includes the ionizing zone 8 comprising ionizing means including a transversely and insulatedly supported ionizing wire 10 spaced between two grounded tubular non-discharging electrodes 12. The electrodes 10 and 12, when suitably energized, establish a concentrated ionizing electrostatic field in the ionizing zone 8. As is well known in the art, an ionizing wire and associated ground electrodes, such as described, will establish an ionizing electrostatic field which comprises moving charged matter in the field-region between the ionizing wire and the associated ground electrodes, the charged matter comprising electrons or ions or charged molecules or combinations thereof, which attach themselves to or otherwise charge dust-particles flowing through the field between the wire and ground electrodes. In this form of embodiment, the conduit-section 4 will usually be rectangular.

An ionizing unit of this type may follow the teachings described in greater detail in my aforesaid patent and the patent to E. H. R. Pegg, No. 2,215,298 issued September 17, 1940. The ionizing wire is preferably relatively fine so that utilizable ionization of the dust-particles in the gas may be obtained at wire-charging voltages in the gas-stream, producing charging currents, yielding negligible ozone-generation and requiring a small power-input when the precipitator is used commercially in air-cleaning systems. The grounded tubular electrodes 12 are usually hollow rounded metallic rods of suitable size which is relatively large compared to that of the relatively fine ionizing wire 10. Preferably positive ionization is utilized in the embodiment shown in Fig. 1, and to this end the ionizing wire is connected to the positive pole of a suitable source of electrical energy, as indicated at P+, the negative terminal P— of the power source being grounded so that, in effect, the grounded electrodes 12 are electrically connected thereto.

For the energization of the various elements of my invention, I prefer to use a limited-energy, voltage-conversion means of the type shown and described in my aforesaid patent, although I am not limited to such means. Such a limited-energy power-conversion means converts the customary commercially available alternating current power-supply to a unidirectional power-supply useful for precipitating apparatus of this kind, for cleaning air to be breathed, and includes safety provisions permitting the converting-means to withstand repeated short-circuits, and signalling-means for indicating faulty conditions of the precipitator.

The precipitating means of the embodiment of Fig. 1 comprises a spray-nozzle 14 having a spray-discharge tip 15 disposed at or slightly above the longitudinal center of the conduit-section 4, the spray-nozzle being continuously fed with a supply of liquid, in this case water, from a supply-pipe 16. The spray discharged from the spray-discharge tip 15 of nozzle 14 is indicated at 18 and is spread out sufficiently to ultimately occupy the full transverse area of the conduit-section 4. Located slightly away from the spray-discharge tip 15 is a suitable field-establishing electrode means. This field-establishing electrode means may be a loop in the form of a completely circular metallic ring 20 which may be either completely closed or split. The ring 20 is supported by a supporting arm 21 carried by an insulator 22 secured to the conduit-section 4. The ring 20 is excited, or given a predetermined potential, by an insulated conductor 24 passing through the conduit. For electrifying or charging the spray, a unidirectional power-supply has its negative terminal P'— grounded and its positive terminal P'+ connected to the conductor 24, so that the circular metal ring 20 is at a positive potential with respect to the conduit-section 4 and therefore at a positive potential with respect to the spray-discharge tip 15 of the nozzle 14, which is grounded to the conduit by a grounding connection of the water-supply pipe 16, the nozzle and the pipe being preferably metallic. In some cases, the same power-supply may advantageously be utilized to establish a field between the spray-discharge tip 15 and the ring 20, and to energize the ionizing electrode-means of the ionizing zone 8.

The positively charged ring-electrode 20 establishes an electrostatic field between itself and the negatively charged nozzle 14, the field being highly concentrated at the small spray-discharge tip 16, so that the spray-drops are ionized or charged negatively by contact and induction. The electric forces established at the spray-discharge tip of the nozzle charge the spray-drops, and these forces also tend to spread the drops and even to decrease their size. In general, a pointed nozzle will give a stronger field-gradient at its tip, and hence a greater spray-charging effect, than a hole in a square-fronted surface. In general, also, a field-establishing ring 20 or grid of any kind, will have a stronger field-establishing effect, and hence a greater spray-charging effect, the greater the aggregate transverse cross-sectional areas of its component wires; and more particularly, the wire or wires of the field-establishing electrodes should each be of a sufficiently large size to avoid point-electrode effects or high local gradients at the wire-surfaces.

During the gas-cleaning operation of the device shown in Fig. 1, the spray is continuously sprayed into the path of the flowing gases. Inasmuch as the dust-particles in the gas have previously received a positive charge, in passing through the ionizing zone 8 before reaching the spray, and inasmuch as the liquid-drops of the spray 18 are negatively charged, the charged dust-particles will be attracted by, and become mechanically attached to, the oppositely charged droplets of the spray 18. While I have mentioned that the dust-charging field positively charges the dust-particles and the spray-charging field negatively charges the spray-drops, the polarities of the fields may be reversed, so that the dust-particles are charged negatively and the spray-drops positively.

The spray being water in the preferred embodiment, any dust-particles which are soluble may actually be dissolved in the water-spray, but insoluble or slightly soluble charged dust-particles will be attracted to the oppositely charged spray-drops by electrical forces and by passing into contact therewith when the gas flows through the spray 18. When the dust-particles do not have a good tendency to adhere to the spray-drops, a wetting agent may be added to the spraying liquid. In air-cleaning, however, the wetting agent chosen should preferably be non-corrosive, free from harmful effects, and not accompanied by operational hazards. Where water is used for the spray, the wetting agent which is added thereto may also serve to lower the freezing point of the spray liquid. Sodium or potassium carbonate, and ethylene glycol are satisfactory in this respect, although other agents can be used, including agents of more recent origin sold under various trade names such as "Aerosal." A wetting agent added to the water also causes the spray drops to be finer, and may improve the cleaning efficiency.

In the application of my invention, I prefer to utilize a spray in which the drops are larger than fog-mists, but finer that drops that drip by gravitational action from a downwardly directed sharp point of a well wetted object. In general, such drops are finer than rain-drops or drops coming from a pipette of 1 mm. inner diameter and 2 mm. outer diameter. However, the drops should not be so fine that they cannot be separated from the flowing gases, and I believe that, for best results, drops of about 100 to 500 microns in size are preferred, although they may be as large as 1000 microns and above, and possibly as small as 10 microns. Sometimes it is desirble to use spray-drops having a size on which gravity may exert sufficient pull, against the pressure of the air-stream, so that by merely properly vertically diverting the gas-stream, the spray-liquid can be separated from the cleaned gas.

In the embodiment shown in Fig. 1, the liquid-drops are separated from the cleaned gas by a threefold means; partially by gravity, partially by causing the gas-stream including the spray-drops to impinge upon a plurality of spray-agglomerating and water-separating baffles 30, all of which are conductively connected to the gas-conduit, or all of which are even maintained at a predetermined potential such as a positive potential with respect said gas-conduit; and partially by the inertia of the spray-drops causing them to impinge upon the far or back side of the upturned duct-portion 6. Some of the charged spray-drops may also be electrically attracted to the grounded metal sides of the gas-conduit section 4. The separated liquid, resulting from the collection of the spray-drops, flows down the downwardly-sloped bottom 32 of the conduit-section 4, to an out-flow pipe 34 dipping into a seal 36 having a discharge 38 above the bottom of the out-flow pipe 34. The seal 36 prevents leakage of the gas through the outlet pipe 34.

In Fig. 2, I show an ionizing means and a precipitating means for a gas conduit of larger cross-sectional area. This embodiment utilizes as many ground electrodes 50 and ionizing wires 52 as the size of the conduit requires, one or two ionizing wires being insulatedly supported from a ground electrode in accordance with the teachings of the aforesaid Pegg patent.

The precipitating means, however, comprises one or more elongated water-supply pipes 54 provided with a plurality of discharge-spray nozzles 56 spaced along the length of the supply pipe or pipes 54. Each nozzle has, associated and cooperating therewith, a loop-electrode 58 which, in this embodiment, is a completely circular metallic ring. The adjacent rings 58 may conveniently contact each other so that all of them can be excited by a single high-voltage conductor 24'.

However, in large units, and even in smaller units, the resulting charged liquid-spray may establish a large space-charge in the region of the spray, and this space-charge may have, at times, a potential-gradient above the breakdown-voltage of the gas flowing therethrough, which would cause frequent flashovers and arcs disturbing the operation and the efficiency of the gas-cleaning precipitator. To keep this potential-gradient within reasonable limits, and specifically below the flashover value, field-affecting means may be provided in the area occupied by the portion of the water-spray on the downstream side of the spray-charging electrodes. This field-affecting means, in the embodiment shown in Fig. 2, comprises a plurality of electrodes in the form of substantially parallel metal plates 62 and 64 between which the water-spray passes. The plates 62 and 64 are maintained at a potential suitable for neutralizing or minimizing the negative space-charge accumulated by the negatively charged spray-particles. In Fig. 2, the plates are illustrated as grounded plates. The upstream sides of these plates are spaced from the rings

58 by a distance which will avoid too high a field-concentration between the grounded plates and the high-voltage rings, and the extent of the plates should be sufficient to perform their intended field-controlling function.

Since, in general, the total charge on the dust-particles is small compared to that on the spray-drops, the space-charge in the portion of the conduit occupied by the metal plates 62 and 64 is determined primarily by the charge on the spray-drops; but under the influence of the space-charge field the spray-drops are driven to the grounded plates 62 and 64, thereby weakening the space-charge field. Additionally, the metal plates provide extended areas of ground-potential, distributed across the spray, so that large overall potentials between two points in the spray-region are prevented.

For typical air-washers for air-conditioning systems, as heretofore known, the weight of the water supplied is of the order of 55% of the weight of the air being cleaned. In my present system, if we assume that the spray-drops are $10^{-2}$ cm. in diameter, which is the equivalent of approximately 1270 drops per cu. cm., and if we assume $10^6$ electrons per spray-drop, which is reasonable for a spray-drop of this size, there will be a space-charge of $1.27 \times 10^9$ electrons per cu. cm. This value is in the order of 10,000 times the aggregate charge on all of the dust-particles on a smoggy day, so that the charge on the dust-particles can be neglected in considering the space-charge in the region of the spray immediately following the spray-charging electrodes such as 20 or 58. If we assume that the air-stream carries these charged spray-drops between the parallel plates 62 and 64, the space-voltage will be a maximum midway between a pair of adjacent plates and will vary as the square of the plate-spacing, with a maximum voltage-gradient at the surfaces of the plates, which gradient varies directly as the spacing between plates.

Figure 2:
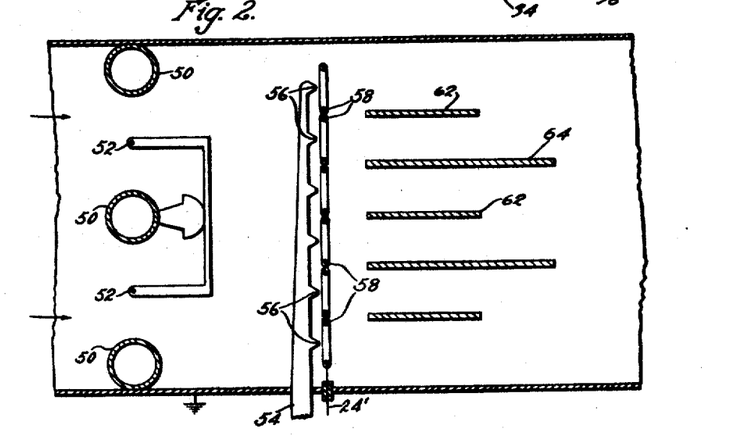
Figs. 2 and 3 are horizontal sectional views illustrating modifications of the invention shown in Fig. 1.

In this non-uniform negative field between any two plates 62 and 64 of Fig. 2, the negatively charged water-droplets and the positively charged dust-particles which are at any point other than the exact center of the space between the plates will be subject to electrostatic forces tending to move them toward or away from the plates. The positively charged particles, namely the dust-particles, move toward the center of the space between the plates, where the negative potential is the greatest. The negatively charged particles, which are the spray-particles, move in the opposite direction, or toward the nearest plate. It is desired that those pairs of these oppositely moving and oppositely charged particles which pass close to each other shall have time to be attracted into contact with each other. The attractive force between any pair of oppositely charged particles varies inversely as the distance between their centers, and hence no effective attractive force exists at all, except when the particles are within a few diameters of each other, referring to the diameter of the larger particle, which is usually the water-droplet. It is obvious that if the opposite velocities of the oppositely charged particles are too great, under the influence of the general space-charge field, very few of these pairs of particles will ever get close enough together for their mutual attractive forces to pull them together.

From the standpoint of the chance of any given charged dust-particle coming into contact with an oppositely charged spray-drop, the plates 62 and 64 should be very close, so as to produce a low-voltage-gradient in the space between the plates. However, as the plates are brought nearer, this very reduction in the voltage-gradient also reduces the number of spray-drops which are driven past any given dust-particle. For this reason, the plates need only be sufficiently close to prevent sparkover between spray-drops; and under the conditions assumed, this spacing would be in the order of about two to five inches on the upstream side, which spacing may be increased further on the downstream side because of the lessened charge-density due to the loss of water-droplets. Accordingly, alternate plates 62 may be made shorter, as indicated in Fig. 2 in which the downstream edges of the plates 62 terminate before the downstream edges of the plates 64.

The spray-nozzles 14 and 56 hereinabove described are of the type which are designed to eject a somewhat conical spray, but it is possible to obtain the spray in any other convenient manner, and in Fig. 3 the spray is obtained by the use of air-pressure. In this embodiment, the ionizing zone 70 is constructed in any suitable manner, and the precipitating means comprises a water-supply pipe 72 having a water-discharge tip 74. A second pipe 76 conveys air under pressure to an air-discharge nozzle 78 which flows across the outlet of the water-discharging tip 74, thereby establishing a water-spray flowing in the direction of the gas-stream. Such a spraying means is useful for the cleaning of process-dust where the degree to which the gas being cleaned is not the sole objective. However, the gas which is supplied to the air-pressure pipe 76 may be tapped from the cleaned-gas side of the system in instances where the cleanliness of the out-flowing gas is an important consideration.

More than one electrode may be used for the high-potential electrode-means of the spray-charging means, and a plurality of field-establishing electrodes may be arranged in the direction of the gas-stream for establishing the field for charging the spray-drops. Thus, in the embodiment shown in Fig. 3, the field-establishing loops comprise a plurality of contacting metal rings 80 and 82 of substantially the same size and aligned in the gas-stream direction.

Figure 3:
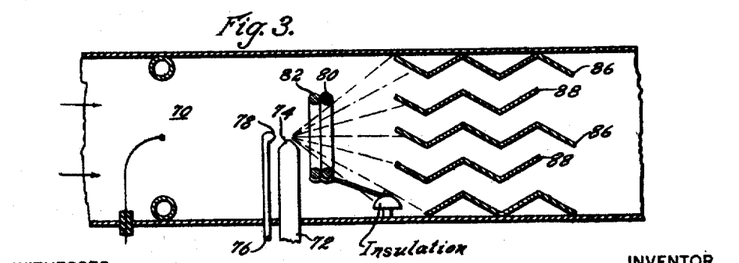

The grounded field-affecting means of the embodiment shown in Fig. 3, for reducing the space-charge in the spray, comprises a plurality of grounded plates 86 and 88, which are conductively attached to the gas-conduit, and which are bent or corrugated so that they will better trap the spray-drops and thereby also act as a separating means for separating the spray from the flowing cleaned gas.

Figure 4:
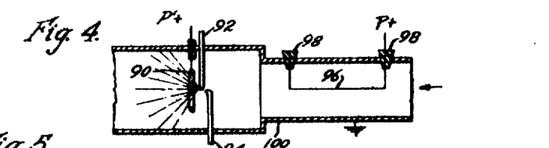
Fig. 4 is a vertical sectional view illustrating modified forms of ionizing means and precipitating means for a precipitator embodying the teachings of my invention.
Figure 5:
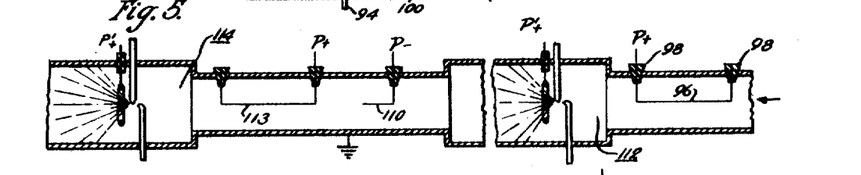
Fig. 5 is a view, similar to Fig. 4, illustrating a gas-cleaning precipitator having two combined cooperating gas-cleaning means in a single gas-conduit.

A modified form of my invention is shown in Fig. 4 in which the precipitating means comprises a charged or excited insulated ring 90 for electrifying the spray created by the spraying-means comprising a water-supply pipe 92 and a compressed-air pipe 94. However, in this embodiment, the gas-conduit is preferably in the form of a circular tube. Such a gas-conduit means adapts itself to the use of a coaxial ionizing wire 96, extending longitudinally of the gas-conduit, rather than transversely as in the prior embodiments, with the outer tube 100 of the conduit itself acting as the non-discharging ground-electrode of the ionizing means. The ionizing wire 96 is supported from insulators 98 carried by the gas-conduit 100, which is grounded.

Where my novel air-cleaning system is newly constructed for a new system, the size of the different parts can be determined for maximum efficiency of the system as a whole. However, if the invention is to be applied to existing gas-flow systems, it may be desirable to cascade, or to arrange in series or tandem, a plurality of successive gas-cleaning means, and in Fig. 5 such an embodiment is shown, which follows the embodiment of Fig. 4. In this embodiment, a second or additional ionizing zone and precipitating means, generally similar in all respects to those of Fig. 4, are inserted in the gas-stream so that the gas undergoes two cleaning operations. However, it is desirable to drive the spray-drops leaving the conduit gas-cleaning means to the conduit-walls before the gas enters the subsequent gas-cleaning means, and to this end a field-producing means comprising an insulatedly supported ionizing wire 110 is provided, which is negatively charged, as indicated by P—, whereas the ionizing wire or wires 96 of the gas-cleaning means 112 on the upstream side, and the ionizing wire or wires 113 of the gas-cleaning means 114 on the downstream side, are positively charged, and the spray-drops are negatively charged, so that the negatively charged spray-drops from the first gas-cleaning means 112 will be repelled toward the conduit-walls and will be prevented from entering the ionizing zone of the second gas-cleaning means 114.

Figure 6:
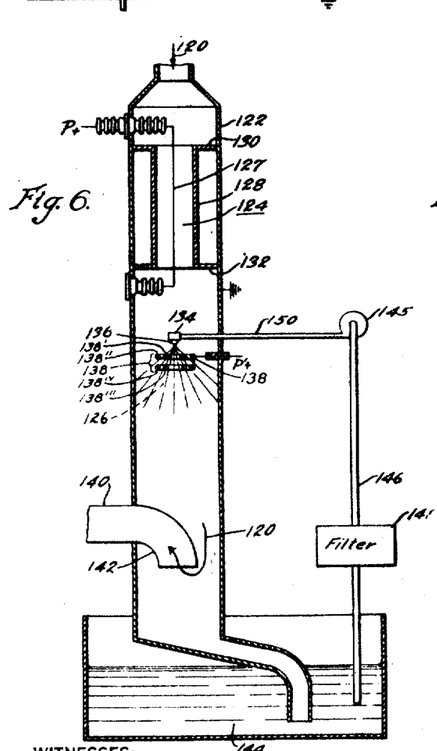
Fig. 6 is a vertical sectional view of a gas-conduit including another form of my invention in which the gas flows vertically downward.
Figure 7:
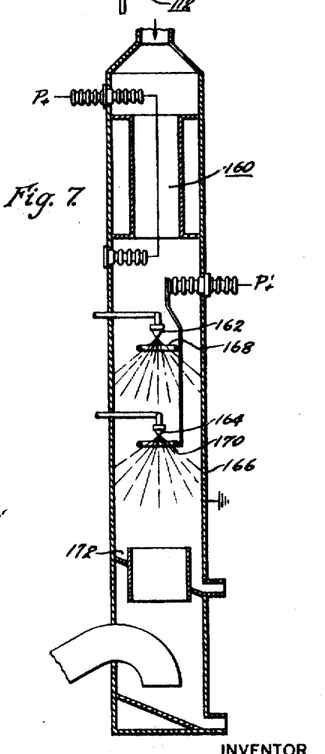
Fig. 7 is a view similar to Fig. 6, illustrating a modified form thereof.

The embodiments thus far described have been shown as placed in horizontal gas-conduits, but the invention is readily adaptable to vertically flowing gas-streams, and in Fig. 6 such an embodiment is shown, in which the gas-flow is indicated by the arrows 120. In this embodiment, the gas-conduit 122 is a hollow round tube, and includes an ionizing zone 124 and a precipitating zone 126. The ionizing zone comprising a positively charged ionizing wire 127 coaxially arranged in an inner metallic circular tube 128, this inner tube being provided within the conduit 122 in order to obtain a more concentrated ionizing field. Suitable annular closing baffles 130 and 132 prevent gas-flow between the inner tube 128 and the outer gas-conduit 122.

The precipitating zone 126 of Fig. 6 includes a precipitating means shown as comprising a spray-nozzle 134 having a spray-discharge tip 136 substantially axially arranged in the gas-conduit 122. A high-voltage ring-electrode means 138 is arranged concentrically in the tube 122, and is spaced from the spray-discharge tip 136 of the nozzle 134 so that the spray will be suitably charged. The ring-electrode means 138 comprises two concentric rings 138' and 138'', and two additional rings 138''' and 138IV spaced slightly on the downstream side of the rings 138' and 138''. All four rings are conductively connected together, and charged by the insulated conductor P'+. The spray may be separated from the cleaned gas by the provision of a gas-outlet-pipe 140 having a down-turned elbow 142 within the gas-conduit 122, so that the cleaned gas is caused to completely reverse its flow, in leaving through the outlet-pipe 140. This causes the spray, because of its momentum and the action of gravitational forces, to be collected in a trap 144 which is provided at the lower end of the conduit 122. Any suitable field-affecting means can be added in the spray-region for limiting the space-charge therein, and also for collecting spray-liquid.

I have cleaned air, containing atmospheric dust, fly-ash, and carbon black, in an apparatus similar to the construction shown in Fig. 6, having the following physical arrangements:

A 5-mil tungsten ionizing wire 127, approximately 15 inches long, and symmetrically spaced with respect to an inner metal tube 128 having an inner diameter of 3 inches and a length of 12 inches, was concentrically placed inside a gas-conduit pipe having a diameter of 6⅝ inches throughout the ionizing zone and the precipitating zone. The precipitating zone included a spraying-nozzle 134, known as Type 1B, which is described in Bulletin 602-C (dated 4-40) of the Spray Engineering Company of Somerville, Massachusetts, and which had its spray-discharge tip 136 about 8 inches from the bottom end of the ionizing wire. The high-voltage field-establishing electrode means 138 comprised two pairs of concentric rings 2⅞ and 3⅛ inches in diameter, respectively, the first pair being on the downstream side of, and about 1 inch from, the spray-discharge tip 136 of the spraying-nozzle, and the second pair being ¼ inch on the downstream side of the first pair of rings. All four rings were of 1/16" wire, and conductively connected together.

The use of electrostatic fields, in addition to a water-spray, appears to be important. Thus, various tests have been made with a specific precipitator as shown in Fig. 6, and having the physical arrangements just described.

In one test, both charging-voltages were left off, both from the dust-charging ionizing wire 127 and from the spray-charging ring-electrode means 138, and I found that the dust-cleaning efficiency of just an uncharged water-spray, for removing atmosphere dust from air, with the dust uncharged, was 13.8%, on the basis of a "blackness" test, which compares the discoloration, as measured by transmitted light, of filter papers on the upstream and downstream sides, respectively, of an electrical dust-precipitator. Then, by charging the water-spray with a unidirectional potential of between 9 and 10 kilovolts, with the spray-nozzle negative as shown, but still without any dust-charging voltage on the ionizing wire 127, the dust-cleaning efficiency was increased to 21.5%. Or, by charging the ionizing wire 127 positively with a unidirectional potential of about 12.5 kilovolts, and using an uncharged water-spray, a dust-cleaning efficiency of 34.9% was obtained. Finally, when using charged dust and a charged water-spray, an efficiency of 44.8% was obtained.

The precipitator, utilizing a dust-charging ionizing electrostatic field and a charged water-spray, was also successfully used for removing fly ash from air with very high efficiencies, and even satisfactorily removing kerosene lamp-black from air.

The amount of charging-current carried away by the water-drops will depend upon the voltages between the spray-nozzle and the spray-charging high-voltage ring-electrode means. The charging-current, for a fixed spacing between the spray nozzle and ring-electrode means, was improved with increasing voltages, up to an optimum value which was approximately that used in the previously described cleaning-efficiency tests. Voltages above the optimum value seemed to decrease the charging-current to the water-spray, but this might be attributed to the possibility of the ring-electrode means changing from a non-discharging electrode to a discharging electrode, positively charged.

The amount of charge which is applied to the spray is also affected by the spacing between the spray-nozzle and its cooperating electrode-means. The charging-current (and hence the charges on the water-droplets of the spray) is generally increased with closer spacing between the ring-electrode means and the spray-nozzle, although an optimum value of spacing also appears to exist. However, with relatively wide spacings, the charging-current rapidly decreases with still further increased spacing between the ring-electrode means and the nozzle.

The amount of charging-current delivered to the water-spray is also affected by, and almost in direct proportion to, the rate at which the water is supplied to the spray-means, the charging-current being larger with increased spray-flow, bearing in mind that a spray-nozzle may have a limiting spraying capacity. The practical limit to the amount of water which may be put into any single spray will depend upon the practical limits of the closeness of the spacing of the field-neutralizing electrodes, such as, for example the plates 30 (Fig. 1). In certain cases, the total amount of water which is used may be divided into two or more sprays, as shown in Fig. 7.

The electric-cleaning effect of the spray can be conveniently adapted to air-conditioning, for sprays of cold water are frequently used for summer air-conditioning, and warmer sprays are frequently used for humidifying air in winter, so that the spray can, in such cases, serve to cool or warm the cleaned air. Additionally, the spray itself may be used to dissolve or react with contaminating substances in the air, such as obnoxious odors or dissolvable dust-particles. If smoky air which contains $SO_2$ is to be cleaned, the addition of some alkali to the water to neutralize the acidic condition formed by the removal of the $SO_2$ is desirable.

A recirculating system for the cleaning-water can be provided, if desired, the water being pumped in any conventional manner with suitable filters provided to remove the dust entrapped in the water. Such recirculating systems would be desirable for cleaning gases or air with liquids which must be treated or are too expensive to permit the use of a fresh supply at all times.

The system of Fig. 6 also shows means whereby the cleaning-liquid may be recirculated by means of a pump 145 having an inlet pipe 146 including a dirt-filter 148, the inlet pipe dipping into the trap 144. The pump 145 pumps the liquid through a discharge-pipe 150 to the nozzle 134, and a system of this kind is useful where the cleaning-liquid is treated. For example, if the dust being collected is very dry, it may be desirable to add a wetting agent to the water, or if the cleaning system be part of an air-conditioning system, it may be desirable to utilize a water solution including a hygroscopic substance, such as $CaCl_2$ or similar agents, for controlling the humidity of the outflowing gas.

I have found that better efficiencies of cleaning can usually be obtained, especially in the smaller sizes of gas-conduits, such as shown in Fig. 6, if a plurality of gas-cleaning means are arranged in series, as shown in Fig. 5. In Fig. 7, I have shown a modification of the Fig. 6 construction whereby better dust-cleaning efficiencies may be obtained by utilizing a plurality of spray-nozzles arranged in the gas-conduit along the direction of gas-flow. This embodiment comprises an ionizing zone 160, similar to that of the embodiment of Fig. 6, and a plurality of spray-nozzles 162 and 164 axially spaced in a gas-conduit 166. Each of the spray-nozzles 162 and 164 has associated therewith a field-establishing electrode 168 and 170, respectively, each in the form of a metallic loop.

Improved gas-cleaning efficiencies can also be obtained with improved spray-forming means capable of discharging the spray-liquid in greater quantities and in finer drops. The gas-cleaning efficiency can also be raised by decreasing the gas-flow velocity through the gas-cleaning apparatus.

Since the gas-conduits of the various embodiments are at ground potential, they attract negatively charged spray-drops, separating them from the gas-stream; and in the embodiment of Fig. 7 a small trough 172 is arranged along the sides of the gas-conduit for receiving water collected by the portion of the conduit 166 in the precipitating zone.

While I have, in general, shown many embodiments in which the liquid-supply pipe and the spraying-nozzle are grounded and the field-establishing electrode-means cooperating therewith are insulated, it is also possible to insulate the nozzle and to ground the field-establishing electrode-means. In such case, the liquid should be fed in a special manner to avoid grounding, and should be collected by insulating means to avoid a continuous liquid-stream grounding the high-potential side of the source of power connected to the nozzle.

While I have shown my invention in certain preferred embodiments thereof, it is obvious that many other embodiments and modifications utilizing the teachings of my invention will be at once apparent to those skilled in the art. Additional systems utilizing a charged liquid-spray for cleaning dust-laden gases are shown and claimed in my copending application Serial No. 393,190, filed concurrently herewith, and entitled Electrical dust precipitator utilizing liquid-sprays.

I claim as my invention:

1. An electrostatic precipitating means comprising in combination for utilizable gas-cleaning with limited charging-voltages: a gas duct-means for a gas-flow; ionizing-apparatus for ionizing, in said duct-means, gas-borne dust-particles, said ionizing-apparatus comprising an insulated inonizing-electrode, a cooperating non-discharging electrode spaced therefrom, and energizing means for applying a unidirectional voltage across said ionizing-electrode and non-discharging electrode, with the ionizing-electrode at a predetermined potential-polarity; dust-precipitating means including spray-means comprising a metallic nozzle-means for producing a liquid-spray in said duct-means across the path for the gas-stream carrying dust-particles ionized by said ionizing-apparatus, the spray being of a type in which the drops are in general larger than those of fog-mists but finer than drops that drip by gravitational action from a downwardly directed sharp point of a well-wetted object, a non-discharging metallic electrode-means insulated from said nozzle-means, and energizing means for applying a unidirectional voltage across said nozzle-means and electrode-means with the latter having a predetermined potential-polarity which is the same as that of said insulated ionizing-electrode and the former having a potential-polarity which is the same as that of said electrode, the last said non-discharging electrode-means cooperating with said nozzle-means for causing the spray-drops issuing therefrom to be charged with a potential-polarity opposite to said predetermined potential-polarity, whereby the charged spray-drops precipitate oppositely charged ionized dust-particles.

2. The electrostatic precipitating means of claim 1, characterized by a plurality of spaced electrode-means in the duct-means starting near the place where the spray first spreads across the duct-means, for limiting the space-charge in the charged spray.

3. An electrostatic precipitating means comprising in combination for utilizable gas-cleaning with limited charging-voltages: a duct-means for a substantially rectilinear gas-flow; ionizing-apparatus for ionizing, in said duct-means, gas-borne dust-particles, comprising an insulated ionizing-electrode and a spaced grounded non-discharging electrode providing a gas-flow space therebetween in which gas-borne dust-particles are ionized; spray-discharge means comprising a grounded metallic nozzle-means for producing a liquid-spray in said duct-means across the path for the gas-stream carrying dust-particles ionized by said ionizing-apparatus, and a cooperating non-discharging electrode-means close to, but insulated from, said nozzle-means for establishing an electrostatic field therewith for causing the drops of said spray to be charged; means comprising a grounded voltage-source, for charging said ionizing-electrode and said non-discharging electrode-means with respect to said non-discharging electrode and said nozzle-means respectively, and with potentials having the same polarity; and means for separating dust-carrying spray-liquid drops from the mingled spray and gas-stream, and withdrawing such separated liquid from said duct-means.

4. The electrostatic precipitating means comprising in combination for utilizable gas-cleaning with limited charging-voltages: a duct-means for a substantially rectilinear gas-flow; ionizing-apparatus for ionizing, in said duct-means, gas-borne dust-particles, comprising an insulated ionizing-electrode and a spaced grounded non-discharging electrode providing a gas-flow space therebetween in which gas-borne dust-particles are ionized; spray-discharge means comprising a grounded metallic nozzle-means for producing a liquid-spray in said duct-means across the path for the gas-stream carrying dust-particles ionized by said ionizing-apparatus, and a cooperating non-discharging electrode-means close to, but insulated from, said nozzle-means for establishing an electrostatic field therewith for causing the drops of said spray to be charged; means comprising a grounded voltage-source, for charging said ionizing-electrode and said non-discharging electrode-means with respect to said non-discharging electrode and said nozzle-means respectively, and with potentials having the same polarity; electrode-means, including a grounded electrode, in the duct-means in the region where the spray has spread across the duct-means, for limiting the space-charge in the charged-spray; and means for separating dust-carrying spray-liquid drops from the mingled spray and gas-stream, and withdrawing such separated liquid from said duct-means.

5. An electrostatic precipitating means comprising in combination for utilizable gas-cleaning with limited charging-voltages: a grounded metallic duct-means for a gas-flow; ionizing-apparatus for ionizing gas-borne dust-particles, comprising an insulated ionizing-wire and a grounded non-discharging electrode-means providing a gas-flow space around said ionizing-wire in which gas-borne dust-particles are ionized; dust-precipitating means for precipitating ionized dust-particles from the gas-stream carrying them, comprising a grounded metallic sharp nozzle-means for maintaining a spray spread across the gas duct-means on the downstream side of said electrode, in the path of the gas-stream carrying the ionized dust-particles, means comprising an insulated non-discharging electrode closely spaced from said nozzle-means for producing a concentrated non-discharging electrostatic field at the point or points where the spray leaves said nozzle-means for causing the spray-drops to be electrically charged oppositely to the charge on the ionized dust-particles; and means for separating dust-carrying spray-liquid drops from the mingled spray and gas-stream, and for removing such separated liquid from the gas duct-means.

6. An electrostatic precipitating means comprising in combination for utilizable gas-cleaning with limited charging-voltages: a grounded metallic duct-means for a gas-flow; ionizing-apparatus for ionizing gas-borne dust-particles, comprising an insulated ionizing-wire and a grounded non-discharging electrode-means providing a gas-flow space around said ionizing-wire in which gas-borne dust-particles are ionized; dust-precipitating means for precipitating ionized dust-particles from the gas-stream carrying them, comprising a grounded metallic nozzle-means for maintaining a spray spread across the gas duct-means on the downstream side of said electrode, in the path of the gas-stream carrying the ionized dust-particles, means comprising an insulated non-discharging electrode closely spaced from said nozzle-means for producing a concentrated non-discharging electrostatic field at the point or points where the spray leaves said nozzle-means, a plurality of grounded metallic electrode-means spaced across the region where the ionized dust-carrying gas and the charged spray have initially commingled across the duct-means, and means for separating dust-carrying spray-liquid drops from the mingled spray and gas-stream, and for removing such separated liquid from the gas duct-means.

7. A device of a class described comprising, in combination for utilizable gas-cleaning: duct-means for a gas-stream, means comprising cooperating spaced ionizing electrode-means and nondischarging electrode-means for ionizing gas-borne dust-particles while flowing with the gas-stream directly through an extended space or spaces provided between the electrode-means, and means for subsequently removing ionized dust-particles from the gas-stream, comprising spray-means including a plurality of oppositely chargeable cooperatively-spaced metallic electrode-means, for providing, across said duct-means, on the down-stream side of the first said electrode-means, a liquid-spray having spray-drops charged to attract said ionized dust-particles, but too large to be carried in suspension in a gas flowing non-rectilinearly, and spray-separation means for separating sprayed liquid carrying dust-particles from the mingled spray and gas-stream and for removing said separated liquid from the duct-means.

8. A device of a class described, comprising in combination: a gas duct-means for a gas-stream; spray-means for introducing a charged liquid-spray in a spray-region across the path of the gas-stream, the liquid-spray being of a type in which the drops are in general larger than those of fog mists but finer than drops that drip by gravitational action from a downwardly directed sharp point of a well wetted object, the drops being charged so as to be capable of providing, in the aggregate, a space-charge in said spray-region, having field potential-gradients sufficient for causing flashovers in said liquid-spray; and field-affecting electrode-means in said spray-region for limiting the field potential-gradients of the said liquid-spray therein so as to be generally insufficient to cause such flashovers.

9. A device of a class described, comprising in combination: a gas duct-means for a gas-stream; spray-means for introducing a charged liquid-spray in a spray-region across the path of the gas-stream, the liquid-spray being of a type in which the drops are in general larger than those of fog mists but finer than drops that drip by gravitational action from a downwardly directed sharp point of a well wetted object, the drops being charged so as to be capable of providing, in the aggregate, a space-charge in said spray-region, having field potential-gradients sufficient for causing flashovers in said liquid-spray; and means comprising a plurality of metallic plate-electrodes spaced transversely across said spray-region, and extending along the gas-flow path, for limiting the field potential-gradients of the said liquid-spray therein so as to be generally insufficient to cause such flashovers.

10. In gas-treating apparatus, means for producing an electrically ionized spray, comprising a pipe-means, one or more nozzle-means associated with said pipe-means for delivering said spray, one or more field-establishing electrode-means closely spaced from said nozzle-means on the spraying side thereof, means for maintaining a unidirectional potential-difference between said field-establishing electrode-means and the liquid issuing from said nozzle-means, and space-charge-affecting electrode-means distributed through a region of spray-laden gas, which is near the spraying side of said nozzle-means where the space-charge in the charged spray may be objectionably large, for partially neutralizing the space-charge in the charged spray, said field-establishing electrode-means and said space-charge-affecting electrode-means being relatively insulated.

11. Continuously operable precipitating means for removing dust-particles from a flowing gas-stream, comprising in combination for utilizable gas-cleaning: a metallic gas-duct for a gas-stream; means for ionizing gas-borne dust-particles in said gas-duct by attachment thereto of charged matter having a predetermined potential-polarity; and dust-precipitating means comprising relatively insulated spray-means and electrode-means, for providing a charged liquid-spray in said gas-duct in the downstream path of the gas-stream carrying said ionized dust-particles, said liquid-spray having spray-drops charged with a potential-polarity opposite to said predetermined potential-polarity, and insulated electrode-means in said gas-duct on the downstream side of said electrode-means, electrifiable so as to have a potential-polarity which is the same as that of said spray-drops, whereby to repel said spray-drops toward said metallic gas-duct.

12. The precipitating means of claim 11 characterized by having on the downstream side of the last said insulated electrode-means, an additional means for ionizing gas-borne dust-particles, and an additional dust-precipitating means for providing a downstream oppositely charged liquid-spray.

GAYLORD W. PENNEY.